Nov. 13, 1962 W. F. HOFMEISTER 3,063,576
WEIGHING MEANS FOR FORK-LIFT TRUCKS
Filed July 11, 1960
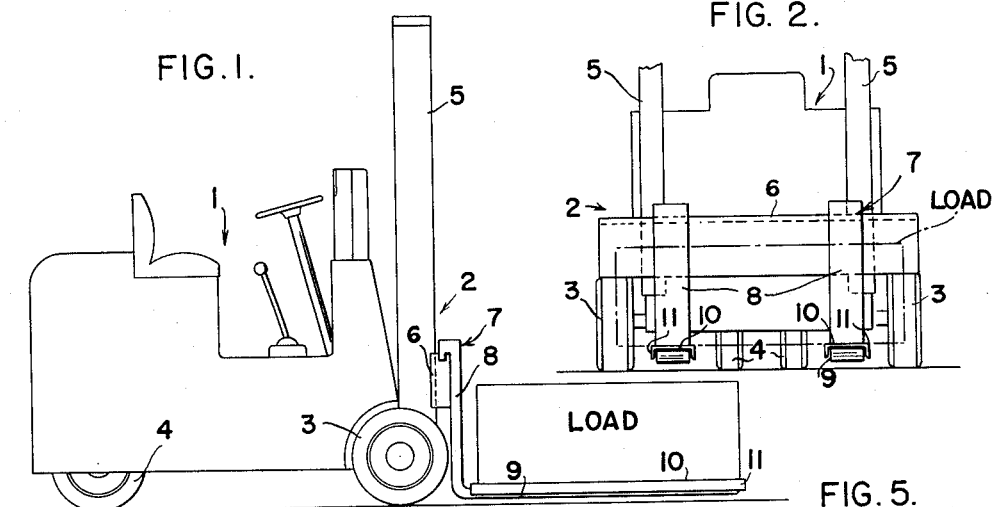
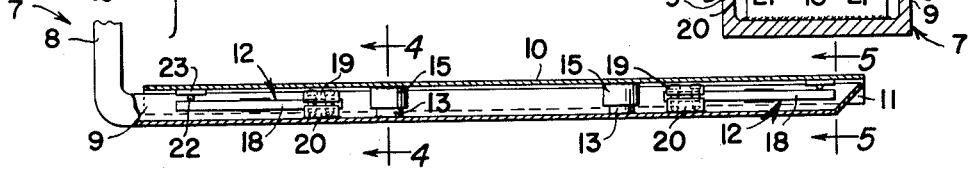
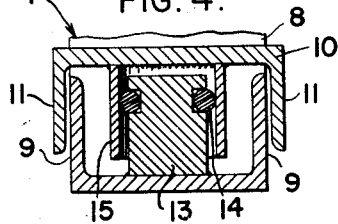
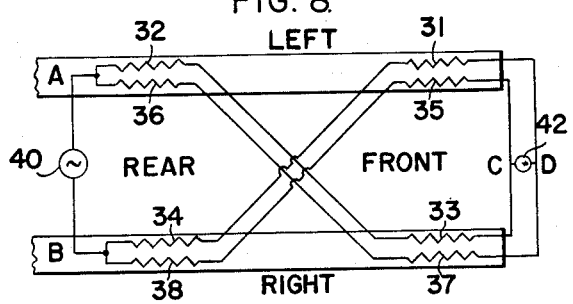
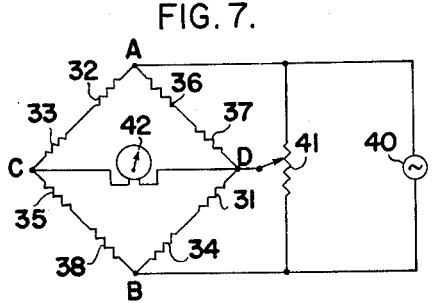

United States Patent Office 3,063,576
Patented Nov. 13, 1962

3,063,576
WEIGHING MEANS FOR FORK-LIFT TRUCKS
William F. Hofmeister, Muskego, Wis., assignor to Chain Belt Company, Milwaukee, Wis., a corporation of Wisconsin
Filed July 11, 1960, Ser. No. 42,147
2 Claims. (Cl. 214—2)

This invention relates to load indicating means and particularly to weighing means for industrial fork lift trucks.

According to the present invention, each fork is provided with a separate upper bar which extends over and the length of the fork and which is supported at each end by pressure-responsive load-cells carried by the fork. Each bar is secured against horizontal movement respecting the corresponding fork without interfering with the support of the load carried by the bar. In the use of the weighing means the load is placed across the bars and the load and bars form the weighing platform. Each load cell shown and described hereinafter includes a tension strain gauge and a compression strain gauge. However, the present invention is particularly intended and adapted for use with two load cells each having a single tension gauge and two load cells each having a single compression gauge. The load-cells are connected with one cell in each of the four legs of a Wheatstone bridge so that the summation of the responses from the four cells indicates the correct total weight of a given load even though the load is not evenly distributed or carried by the four load-cells.

The principal object of the invention is to provide an accurate scale that is sufficiently rugged to be carried continuously on industrial fork lift trucks so that the scale may be used for inventory and stock control purposes.

A further object is to provide weighing means which is more reliable and requires less frequent adjustment or checking for accuracy.

The drawings furnished herewith illustrate the best mode of carrying out the invention as presently contemplated and set forth hereinafter.

In the drawings:
FIGURE 1 is a side elevation of an industrial fork lift truck with a load supported on the forks of the truck;
FIG. 2 is a front view of the truck shown in FIG. 1 and with the load shown in broken lines;
FIG. 3 is a larger longitudinal cross-section of one of the forks showing the construction thereof and the load cells in side elevation;
FIG. 4 is a further enlarged section taken on line 4—4 of FIG. 3;
FIG. 5 is a similarly enlarged cross-section taken on line 5—5 of FIG. 3 showing a load cell in end elevation;
FIG. 6 is a similarly enlarged side elevation of one of the load cells and parts of the fork in section;
FIG. 7 is a diagram showing the meter and the several gauges of the load cells arranged in the Wheatstone bridge which includes the meter indicating the load;
FIG. 8 is a diagrammatic illustration showing the disposition of the several gauges of the load-cells with respect to the two forks of the truck.

The lift truck 1 shown in the drawings includes the carriage 2 provided with forward and rear wheels 3 and 4, respectively. The vertical spaced columns 5 at the front of the truck provide guide means for the vertical movement of the cross head 6 which is effected by hydraulic or other power operated means, not shown, controlled by the operator.

The upper end of the vertical leg 8 of each fork 7 is connected on cross-head 6 so that the forks may be spaced as desired to support the load or fit pallets of different sizes. Each fork 7 including leg 8 should be of the sturdiest possible construction to support the load and in the drawing which is illustrative only, each fork is of a U-shaped section with the sides 9 standing upwardly. A platform 10 comprising a U-shaped bar or channel is supported over each fork 7 with the fork disposed between the downwardly extending sides 11 of the platform. Each platform 10 is supported by two load cells 12 as will be described, and except when a load is being carried, the platform is secured against lateral movement respecting the fork by two guide means such as shown in section in FIG. 4 and as will be described.

The guide means shown includes the pin 13 provided with the resilient O-ring 14 fitting within the sleeve 15. Pin 13 is fixed to fork 7 and sleeve 15 is fixed to the platform so that the slight vertical movement of the platform respecting the fork as required is allowed by sliding of the sleeve on the ring, or by a slight rolling action of the ring. Such sliding or rolling action should, of course, require very little force so that no measurable part of the weight of the load is carried by the guide means.

The four load cells 12 are identical in all respects and each cell includes a cantilevered strain bar which is fixed at one end by support means such as, for example, the upper and lower blocks 19 and 20. Blocks 19 and 20 are secured together by the screws 21 and the lower block 20 of each load cell 12 is fixed to the fork 7 between sides 9.

The other end of each bar 18 is fitted with a round fulcrum member 22 to engage the bearing plate 23 fixed to the underside of the platform between its sides 11. Member 22 and plate 23 should have a high hardness for maximum wear life. Member 22 may be a short length of drill-rod or the like and may be welded or otherwise fixed to the bar 18 or may be seated and secured endwise in a groove extending across the top side of the bar near the end thereof.

Members 22 and plate 23 have at all times a line contact which is the fulcrum axis as to deflection of the bar. This axis must be spaced the same distance from the active centers of the gauges for each bar 18. The bars of each fork 7 extend horizontally in opposite directions for maximum stability of the transported load and with plates 23 are spaced so that the fulcrum axes referred to are as far apart from each other and as near as possible to the ends of the platform.

In picking up a load, the operator of truck 1 inserts the forks in the pallet (of known weight) carrying the load to be weighed, or under the load itself which is assumed to be rigid in all cases so that when the forks are raised and the load is resting on the platforms 10, the platforms are held in a generally horizontal plane which is parallel with the fulcrum axes referred to and the load together with the platforms comprise the "effective" platform.

In the embodiment of the invention shown in the drawings, each bar 18 is provided with both a tension and a compression gauge located on the upper and lower surfaces, respectively, of the bar as shown in FIG. 6. The eight gauges of the four bars include tension gauges 31–34 and compression gauges 35–38. However, only two of the tension gauges and two of the compression gauges shown are required for the present invention.

The load cells are arranged in the Wheatstone bridge as shown in FIG. 7 so that the tension gauges and the compression gauges are, respectively, in opposite legs of the bridge between corners A–D.

The source of electrical energy 40 is of a given constant potential and source 40 and end taps of the potentiometer 41 are connected to input corners A and B of the bridge. The meter 42 is connected to the output corners C and D of the bridge and the adjustable tap of potentiometer 41 is connected to corner D. Adjustment of potentiometer 41 allows the potential at corner D to be raised or lowered with respect to the potential at corner C as shown by meter 42 to provide a no-load indication. Other resistance means to adjust the potential of corners C and D to a value intermediate that of corners is not ordinarily required. Various electrical systems may also be employed which will compensate for variations in the potential of source 40 which source may also be of constant or alternating polarity.

In operation of the lift truck, the operator drives the truck to move the forks under the load and then raises cross-head 6 so that the load is lifted and supported on platforms 10 and the load and platforms 10 form the effective platform supported at its four corners by load cells 12. However, the center of gravity of the load is only on occasion, and then only by chance located so that the weight is borne equally by all four load cells. With the load cells supporting the ends of bars 10, the placement of the load on the forks or the location of the center of gravity with respect to the effective platform does not affect the accuracy of the total weight indication and the load is always supported with maximum stability.

O-rings 14 provide the lateral support of the individual platforms where no load is placed across the forks. The vibration of the truck will allow the plates 23 to slide on bearing members 22 and the resilient O-rings 14 in keeping the pin 13 and sleeve 15 centered also keep the platforms 10 in place over the forks. When the forks are lifted to engage the load, the load is then secured laterally by the frictional engagement of the four plates 23 on bearing members 22. The load then joins the two platforms 10 to form the effective platform, referred to, which is rigid in the horizontal direction and instead of the guide means, all four load cells 12 together provide the horizontal securement of the load.

Various embodiments of the invention may be employed within the scope of the following claims:

I claim:
1. In a fork-lift truck including a pair of laterally movable forks, each fork having a lower arm and a platform of substantially the length and width of and disposed above each fork arm and each lower arm having load cells supporting the ends of the respective platform, said load cells including electrical resistance means which are subject to a given change in resistance in response to a given change in the weight supported by the respective load cells, and electrical circuit means including a source of energy, said resistance means and indicating means being responsive to the total change in resistance of said resistance means as it occurs when a load is applied to or removed from the forks, the improvement wherein the load cells include load bars with cantilevered ends extending in opposite directions toward the ends of the platform and including bearing means acting as fulcrum supports for said platforms, said bearing means being disposed between said cantilevered ends and the platforms and having line-contacts which are parallel and are adjacent to the corresponding ends of the platforms.

2. In a fork-lift truck including a pair of laterally movable forks, each fork having a lower arm and a platform of substantially the length and width of and disposed above each fork arm and each lower arm having load cells supporting the ends of the respective platform, said load cells including electrical resistance means which are subject to a given change in resistance in response to a given change in the weight supported by the respective load cells; said load cells of each fork including load bars with cantilevered ends extending in opposite directions toward the ends of the platform and including bearing means acting as fulcrum supports for said platforms, said bearing means being disposed between said cantilevered ends and the platforms and having line-contacts which are parallel and are adjacent to the corresponding ends of the platforms.

References Cited in the file of this patent
UNITED STATES PATENTS

| 2,638,336 | Wetsel | May 12, 1953 |
| 2,822,095 | Buckingham | Feb. 4, 1958 |
| 2,935,213 | Cellitti et al. | May 3, 1960 |